US010628008B2

(12) United States Patent
Takikawa

(10) Patent No.: US 10,628,008 B2
(45) Date of Patent: Apr. 21, 2020

(54) INFORMATION TERMINAL CONTROLLING AN OPERATION OF AN APPLICATION ACCORDING TO A USER'S OPERATION RECEIVED VIA A TOUCH PANEL MOUNTED ON A DISPLAY DEVICE

(71) Applicant: HONDA MOTOR CO., LTD., Tokyo (JP)

(72) Inventor: Keiichi Takikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/689,716

(22) Filed: Aug. 29, 2017

(65) Prior Publication Data
US 2018/0059912 A1 Mar. 1, 2018

(30) Foreign Application Priority Data
Sep. 1, 2016 (JP) ................................. 2016-171212

(51) Int. Cl.
*G06F 3/041* (2006.01)
*G06F 3/0484* (2013.01)
(Continued)

(52) U.S. Cl.
CPC .......... *G06F 3/04842* (2013.01); *B60K 35/00* (2013.01); *B60K 37/06* (2013.01); *G06F 3/04817* (2013.01); *G06F 3/04883* (2013.01); *G06F 3/04886* (2013.01); *B60K 2370/11* (2019.05); *B60K 2370/113* (2019.05); *B60K 2370/115* (2019.05); *B60K 2370/119* (2019.05);
(Continued)

(58) Field of Classification Search
CPC ............... G06F 3/0482; G06F 3/04817; G06F 3/04886; B60K 35/00; B60K 37/06
USPC ......................................................... 345/173
See application file for complete search history.

(56) References Cited

U.S. PATENT DOCUMENTS 9,619,139 B2  4/2017  Wada et al.
2008/0163119 A1* 7/2008  Kim .................... G06F 3/04886
715/840

(Continued)

FOREIGN PATENT DOCUMENTS

JP   10-269022     10/1998
JP   2005-207976 A  8/2005
(Continued)

OTHER PUBLICATIONS

Japanese Office Action dated Jul. 10, 2018, 3 pages.

*Primary Examiner* — Adam J Snyder
(74) *Attorney, Agent, or Firm* — Rankin, Hill & Clark LLP

(57) ABSTRACT

An information terminal controlling operations of applications according to a user's operation received via a touch panel includes a display control unit configured to display a first functional icon assigned with a first operation that is activated when the user touches the first functional icon for a predetermined period of time or less, wherein the display control unit displays a second functional icon at a position adjacent to the first functional icon when the user touches the first functional icon for more than the predetermined period of time, and wherein the second functional icon assigned with another operation, which is different from the first operation, that is activated when the user touches the second functional icon.

6 Claims, 10 Drawing Sheets

(51) Int. Cl.
  *B60K 35/00*   (2006.01)
  *B60K 37/06*   (2006.01)
  *G06F 3/0481*  (2013.01)
  *G06F 3/0488*  (2013.01)

(52) U.S. Cl.
  CPC .................. *B60K 2370/146* (2019.05); *B60K 2370/1438* (2019.05); *B60K 2370/1442* (2019.05); *G06F 3/04847* (2013.01); *G06F 2203/04808* (2013.01)

(56) References Cited

U.S. PATENT DOCUMENTS

| | | | | |
|---|---|---|---|---|
| 2010/0131880 | A1* | 5/2010 | Lee | G06F 3/04817 345/173 |
| 2012/0084690 | A1* | 4/2012 | Sirpal | G06F 1/1616 715/769 |
| 2012/0236037 | A1* | 9/2012 | Lessing | G06F 3/017 345/661 |
| 2013/0058019 | A1* | 3/2013 | Lee | G06F 3/04883 361/679.01 |
| 2013/0082965 | A1* | 4/2013 | Wada | G06F 3/04883 345/173 |
| 2013/0174094 | A1* | 7/2013 | Heo | G06F 3/04883 715/835 |
| 2013/0205210 | A1* | 8/2013 | Jeon | G06F 3/04883 715/716 |
| 2014/0282234 | A1* | 9/2014 | Ku | G06F 3/04817 715/800 |
| 2014/0380239 | A1* | 12/2014 | Kang | G06F 3/0482 715/810 |
| 2015/0256663 | A1* | 9/2015 | Takikawa | H04M 1/7253 455/418 |
| 2018/0018084 | A1* | 1/2018 | Kim | G06F 3/0488 |

FOREIGN PATENT DOCUMENTS

| | | |
|---|---|---|
| JP | 2011-170401 | 9/2011 |
| JP | 2013-093021 A | 5/2013 |
| JP | 2013-222353 A | 10/2013 |
| JP | 2014-123674 | 7/2014 |

* cited by examiner

INFORMATION TERMINAL CONTROLLING AN OPERATION OF AN APPLICATION ACCORDING TO A USER'S OPERATION RECEIVED VIA A TOUCH PANEL MOUNTED ON A DISPLAY DEVICE This application is based on and claims the benefit of priority from Japanese Patent Application No. 2016-171212, filed on 1 Sep. 2016, the content of which is incorporated herein by reference.

BACKGROUND OF THE INVENTION

Field of the Invention

The present invention relates to an information terminal that performs control on functional icons for controlling the functions of applications.

Related Art

In recent years, an information terminal used in a vehicle such as an automobile has versatile functions such as an information search function and a short-message transmitting/receiving function in addition to an audio function and a car navigation function. Accordingly, the number of functional icons (buttons) for operations displayed on a touch panel is also increasing. Information terminals roughly come in two types: one is terminals mounted on a vehicle and the other is general-purpose wireless communication terminals (typically smartphones) having a touch panel mounted thereon used by bringing the same into a vehicle. In contrast, in recent years, there is a strong demand for bringing a small information terminal (typically a smartphone) having touch panel mounted thereon into an automobile and using a music playing function and a car navigation function.

However, the screens (the touch panels) of information terminals mounted on a vehicle have a size of around 7 inches whereas a large number of smartphones have a screen as small as approximately 4 inches to 5 inches and the amount of information displayable on the screen is also limited. In this way, when a plurality of functional icons which is executed by a touch operation is to be displayed at the same time, it is necessary to reduce the sizes of the individual functional icons. However, it is difficult for a driver to reduce the sizes of the individual functional icons during driving and it is not acceptable.

In this way, in the conventional technology, it is necessary to limit the number of functional icons displayed on a screen. Specifically, the number of functional icons that can be arranged on a screen is limited since it is necessary to display functional icons on a screen so as to have such a size that a person can select the icon by a touch operation on a touch panel. In smartphones having the screen size of approximately 4 inches to 5 inches particularly, the number of functional icons displayed on the screen is limited drastically. When a person calls a necessary function, the person may need to call a menu screen first, which makes operations complex.

Therefore, in recent years, for example, Patent Document 1 discloses a technology in which an operation of an application and switching of applications are allocated to a single-touch swiping operation and a multi-touch swiping operation on a touch panel to enable users to operate an application without visually recognizing a display device. Patent Document 2 discloses a portable information processing device that displays an image around the coordinates of a point at which the finger of a user approaches a display device at an enlarged scale. Patent Document 3 discloses a technology in which when a user points and selects a major item input selection image, a minor item input selection image is displayed in a circular region around the pointing position as a pop-up window. The technology of Patent Document 3 is referred to as so-called flick input and is commonly used for inputting characters such as the Japanese Kana or the Alphabet.

Patent Document 1: Japanese Unexamined Patent Application, Publication No. 2014-123674
Patent Document 2: Japanese Unexamined Patent Application, Publication No. H10-269022
Patent Document 3: Japanese Unexamined Patent Application, Publication No. 2011-170401

SUMMARY OF THE INVENTION

However, in the technology disclosed in Patent Document 1, although it is possible to execute functions without displaying functional icons, it is ideal to limit the swiping operations to the four directions of up, down, left, and right in order to prevent operation errors. As a result, four functions only are allocated.

In the technology disclosed in Patent Document 2, since a predetermined region is just displayed at an enlarged scale, many functional icons are displayed on a screen in a normal mode before the enlarged view mode is executed, and it is necessary to reduce the sizes of functional icons displayed in the normal mode.

Therefore, it is difficult to visually recognize small functional icons, and such a technology is not suitable for use in a vehicle.

In the flick input technology disclosed in Patent Document 3, since menus are displayed around the pointing position, it is difficult to display the display region at an enlarged scale.

Since a general flick input technology inputs characters by swiping a pointing finger in contact with a region around the pointing point, a wide display region is not required, and it is not necessary to display menus (buttons) in a wide region.

The present invention has been made in view of the above-described problems and an object thereof is to provide an information terminal which improves operability of functional icons displayed on the information terminal by displaying a functional icon together with a plurality of functional icons associated with the functional icon as necessary.

(1) An information terminal program (for example, a drive-mode application 1 to be described later) that causes an information terminal (for example, an information terminal 50 to be described later) controlling operations of applications according to a user's operation received via a touch panel (for example, a touch panel 241 to be described later) mounted on a display device (for example, a display 24 to be described later) to function as: a display control unit (for example, a display control unit 114 to be described later) configured to display a first functional icon assigned with a first operation that is activated when the user touches the first functional icon for a predetermined period of time or less, wherein the display control unit displays a second functional icon at a position adjacent to the first functional icon when the user touches the first functional icon for more than the predetermined period of time, and wherein the second functional icon is assigned with another operation, which is different from the first operation, that is activated when the user touches the second functional icon.

According to the program of (1), the display control unit (for example, a display control unit 114 to be described later) displays a second functional icon to which an operation different from a first operation allocated to a first functional icon is allocated so that the second functional icon is operated by a touch operation of a user at a position adjacent to the first functional icon when the first functional icon is long-pressed.

In this way, it is possible to easily call the second functional icon for executing another function by long-pressing the first functional icon and the operability of the vehicle driver is improved.

(2) The information terminal program described in (1), wherein the second functional icon includes a plurality of second functional icons, and the information terminal (for example, an information terminal 50 to be described later) also functions as the display control unit (for example, a display control unit 114 to be described later) that displays the plurality of second functional icons around the first functional icon.

According to the program of (2), the display control unit (for example, a display control unit 114 to be described later) displays a plurality of second functional icons around the first functional icon when the first functional icon is long-pressed.

In this way, it is possible to easily display a plurality of second functional icons for executing other functions around the first functional icon by long-pressing the first functional icon, and the operability of the vehicle driver, for example, is improved.

(3) The information terminal program described in (1) or (2), wherein the information terminal (for example, an information terminal 50 to be described later) also functions as the display control unit (for example, a display control unit 114 to be described later), wherein when the user touches the first functional icon for more than the predetermined period of time, the display control unit displays a new first functional icon at a position different from a position where the user touches the first functional icon, and displays the second functional icon at a position adjacent to the new functional icon.

According to the program of (3), the display control unit (for example, a display control unit 114 to be described later) displays the first functional icon as a new first functional icon at another position when the first functional icon is long-pressed.

In this way, the users can operate the first functional icon easily and immediately since the first functional icon can be displayed at an easily noticeable position of the display device (for example, a display 24 to be described later).

(4) The information terminal program described in (3), wherein the information terminal (for example, an information terminal 50 to be described later) also functions as the display control unit (for example, a display control unit 114 to be described later) that does not change the design of the new first functional icon when displaying the first functional icon at a position different from the position when the touch operation was input.

According to the program of (4), the display control unit (for example, a display control unit 114 to be described later) does not change the design of the new first functional icon when the first functional icon is displayed at a position different from the position when the touch operation was input.

In this way, the user can immediately recognize that the functional icons are the same functions.

(5) The information terminal program described in (3) or (4), wherein the information terminal (for example, an information terminal 50 to be described later) also functions as the display control unit (for example, a display control unit 114 to be described later), wherein when the display control unit displays the new functional icon at the position different from the position where the user touches the first functional icon, the display control unit continuously displays, as an old first functional icon, the first functional icon in a visually recognizable manner, and the display control unit allocates a function to the old first functional icon so that when the user touches the old first functional icon, a second operation is activated.

According to the program of (5), the display control unit (for example, a display control unit 114 to be described later) performs control so that a second operation different from a first operation is executed by a touch operation on an old first functional icon when the user long-presses the old first functional icon.

In this way, it is possible to use the second function by pressing the old first functional icon and the user's usability is improved.

(6) The information terminal program described in (5), wherein the information terminal (for example, an information terminal 50 to be described later) also functions as the display control unit (for example, a display control unit 114 to be described later) that allocates the second operation which is a function of cancelling the display of the new first functional icon to a region outside of the regions of the new and old first functional icons.

According to the program of (6), the display control unit (for example, a display control unit 114 to be described later) can cancel the display of the old first functional icon by pressing the old first functional icon.

In this way, by allocating the function of cancelling the display of the old first functional icon to the old first functional icon, it is not necessary to provide an additional cancel button and the user's usability is improved.

(7) The information terminal program described in any one of (1) to (6), wherein the information terminal (for example, an information terminal 50 to be described later) also functions as the display control unit (for example, a display control unit 114 to be described later) that displays the new first functional icon and the second functional icon so that a total area thereof is a predetermined percentage or more with respect to the area of the display device (for example, a display 24 to be described later).

According to the program of (7), the display control unit (for example, a display control unit 114 to be described later) displays the first functional icon and the second functional icon in a large area on the display screen.

By doing so, the user can immediately ascertain the position of the functional icons and the usability is improved.

(8) The information terminal program described in any one of (3) to (7), wherein the information terminal (for example, an information terminal 50 to be described later) also functions as the display control unit (for example, a display control unit 114 to be described later) that displays the second functional icon so that the curvature of a portion of a contour of a widget in which the first functional icon at the position when the touch operation was input is displayed is substantially identical to the curvature of a circumference of the second functional icon.

According to the program of (8), the display control unit (for example, a display control unit 114 to be described later) displays the second functional icon so that the curvature of a portion of a contour of a widget in which the first functional icon is displayed is substantially identical to the curvature of a circumference of the second functional icon.

In this way, since a contour-like region appears between the circumference of the second functional icon and the side of the widget, it is possible to secure visibility even when a thick contour is not provided.

(9) An information terminal (for example, an information terminal 50 to be described later) controlling operations of applications according to a user's operation received via a touch panel (for example, a touch panel 241 to be described later) mounted on a display device (for example, a display 24 to be described later), the information terminal including:

a display control unit configured to display a first functional icon assigned with a first operation that is activated when the user touches the first functional icon for a predetermined period of time or less, wherein the display control unit displays a second functional icon at a position adjacent to the first functional icon when the user touches the first functional icon for more than the predetermined period of time, and wherein the second functional icon is assigned with another operation, which is different from the first operation, that is activated when the user touches the second functional icon.

(10) The information terminal (for example, an information terminal 50 to be described later) described in (9), wherein the second functional icon includes a plurality of second functional icons, and the display control unit (for example, a display control unit 114 to be described later) displays the plurality of second functional icons around the first functional icon.

(11) The information terminal (for example, an information terminal 50 to be described later) described in (9) or (10), wherein when the user touches the first functional icon for more than the predetermined period of time, the display control unit (for example, a display control unit 114 to be described later) displays a new first functional icon at a position different from a position where the user touches the first functional icon, and displays the second functional icon at a position adjacent to the new functional icon.

(12) The information terminal (for example, an information terminal 50 to be described later) described in (11), wherein the display control unit (for example, a display control unit 114 to be described later) does not change the design of the new first functional icon when displaying the first functional icon at a position different from the position when the touch operation was input.

(13) The information terminal (for example, an information terminal 50 to be described later) described in (11) or (12), wherein when the display control unit displays the new functional icon at the position different from the position where the user touches the first functional icon, the display control unit (for example, a display control unit 114 to be described later) continuously displays, as an old first functional icon, the first functional icon in a visually recognizable manner, and the display control unit allocates a function to the old first functional icon so that when the user touches the old first functional icon, a second operation is activated.

(14) The information terminal (for example, an information terminal 50 to be described later) described in (13), wherein the display control unit (for example, a display control unit 114 to be described later) allocates the second operation which is a function of cancelling the display of the new first functional icon to a region outside of the regions of the new and old first functional icons.

(15) The information terminal (for example, an information terminal 50 to be described later) described in any one of (9) to (14), wherein the display control unit (for example, a display control unit 114 to be described later) displays the new first functional icon and the second functional icon so that a total area thereof is a predetermined percentage or more with respect to the area of the display device (for example, a display 24 to be described later).

(16) The information terminal (for example, an information terminal 50 to be described later) described in any one of (11) to (15), wherein the display control unit (for example, a display control unit 114 to be described later) displays the second functional icon so that the curvature of a portion of a contour of a widget in which the first functional icon is displayed is substantially identical to the curvature of a circumference of the second functional icon.

According to the information terminals (for example, an information terminal 50 to be described later) of (9) to (16), the same effects as those of the programs of (1) to (8) are obtained.

According to the present invention, it is possible to provide an information terminal which improves operability of functional icons displayed on the information terminal by displaying a functional icon together with a plurality of functional icons associated with the functional icon as necessary.

DETAILED DESCRIPTION OF THE INVENTION

Hereinafter, a preferred embodiment of the present invention will be described with reference to the drawings.

A program according to the present invention is applied to an information terminal 50 and realizes various functions of the information terminal 50.

The information terminal 50 is a terminal device that receives a user's operation via a touch panel. For example, the information terminal 50 may be a smartphone, a tablet terminal, an in-vehicle car navigation device, or a PND (portable navigation device).

[System Configuration of Information Terminal 50]

The system configuration of an information terminal 50 on which a program according to the present invention is installed will be described with reference to FIG. 1.

Figure 1:
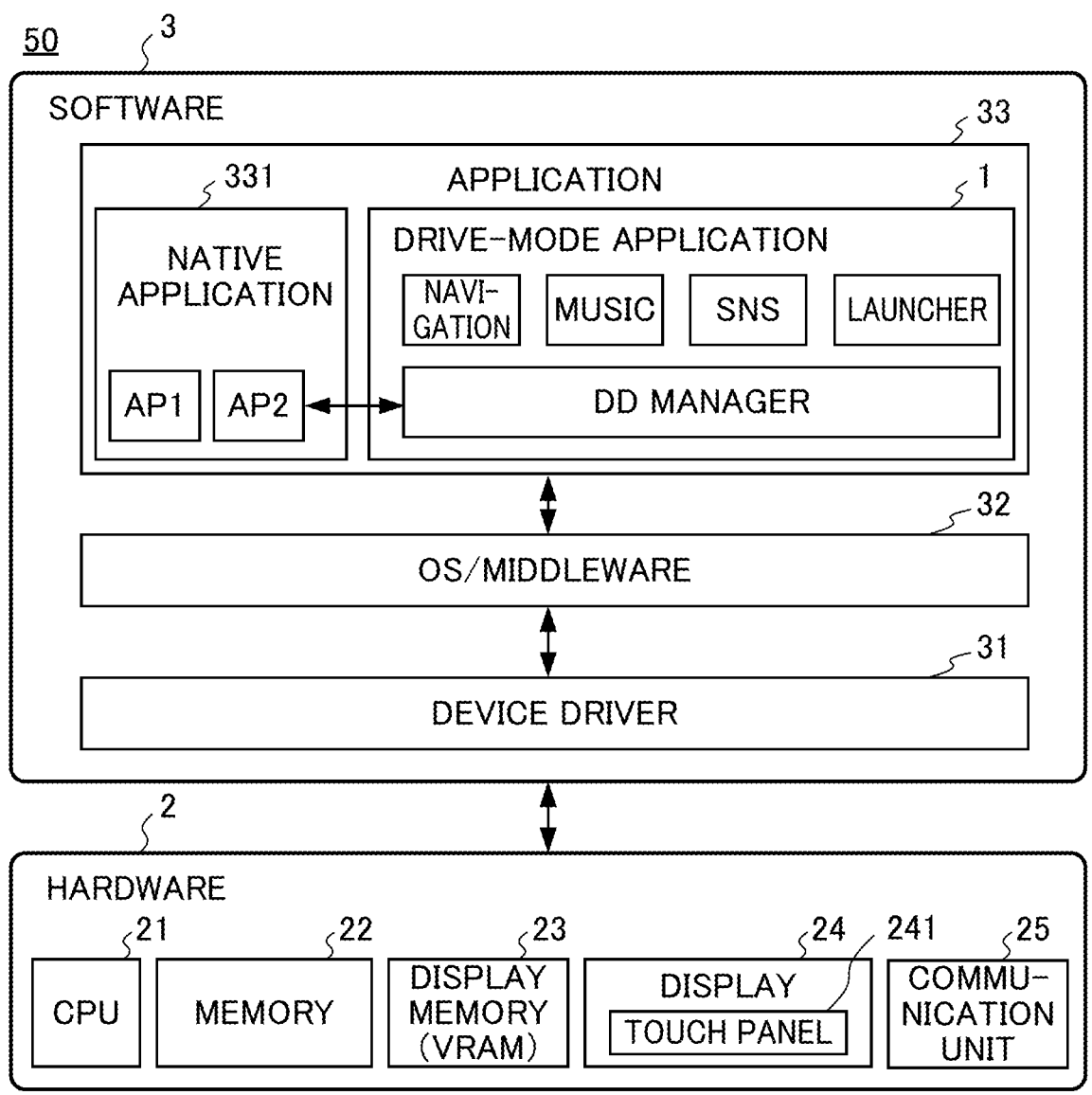
FIG. 1 is diagram illustrating a system configuration of an information terminal in which a drive-mode application according to the present invention is installed.

FIG. 1 is a diagram illustrating the system configuration of the information terminal 50.

The information terminal 50 is configured to include at least: a CPU 21; a memory 22; a display memory (VRAM: Video RAM) 23; a display 24; and a communication unit 25 as hardware 2 and to include at least: a device driver 31; an OS/middleware 32; and an application 33 as software 3.

The CPU 21 is a part that integrally controls the information terminal 50 and reads and executes various programs, thereby realizing various functions to be described later in cooperation with the hardware described above.

The memory 22 stores programs that are read and executed as necessary and stores various kinds of information generated by executing the programs.

The display memory 23 is a memory that maintains data to be displayed on the display 24.

The display 24 displays a predetermined image.

A touch panel 241 is mounted on the surface of the display 24, and receives the user's operations.

In this embodiment, the operations received by the touch panel 241 include a selection operation (a so-called tap) selecting an arbitrary position of the display 24 and a swiping operation (a so-called swipe or flick) involving moving a finger after selecting an arbitrary position of the display 24.

The touch panel 241 is configured by a multi-touch panel capable of sensing a plurality of contact points.

An operation received via the touch panel 241 is transmitted to a processing system (CPU 21) and is processed.

The communication unit 25 connects the information terminal 50 and another device to each other via a wired connection or a wireless connection and controls communication executed between them.

In this embodiment, the communication unit 25 connects the information terminal 50 and a control device (for example, an ECU: engine control unit) of a vehicle to each other.

The method of connecting the information terminal 50 and the control device of the vehicle is not limited. For example, the connection may be made by attaching the information terminal 50 to an attachment dock arranged in the vehicle or by using a predetermined cable such as a signal cable, e.g., a USB (registered trademark), or a feeder cable for supplying electricity to the information terminal 50.

In addition, the information terminal 50 and the control device of the vehicle may be connected to each other via a wireless connection such as a wireless LAN or Bluetooth (registered trademark) connection.

The device driver 31 controls the hardware described above.

In this embodiment, in accordance with an instruction from the OS/middleware 32, data is written into the display memory 23, and the display of the display 24 is controlled based on the written data.

The OS/middleware 32 is responsible for relaying between the application 33 and the hardware 2 and additionally executes management of resources of the system and the like.

In addition, the OS/middleware 32 according to this embodiment supports a multi-tasking environment in the information terminal 50.

The application 33 is software having a function for executing an operation desired to be executed by the user of the information terminal 50.

The application 33 includes at least a drive-mode application 1 that is a program according to the present invention and a native application 331.

The native application 331 refers to any given applications other than the drive-mode application 1 and includes an application permitted to be used during driving and an application not permitted to be used during driving.

The drive-mode application 1 is an application that operates when a connection between the information terminal 50 and the vehicle is detected, or when a user's operation is received in addition to the detection of a connection to the vehicle, or when the vehicle is detected to be in the course of driving in addition to a detection of a connection to the vehicle. The drive-mode application 1 realizes a user interface that manages input/output from/to an occupant (driver) of the vehicle.

The drive-mode application 1, for example, is described in HTML5 and is configured to include: a DD manager that prohibits a complicated operation and the like during driving; a plurality of applications that operate on the drive-mode application 1; and an independent launcher that switches an application to be operated.

The plurality of applications are applications that can be used during driving and include an application added later in addition to applications set in advance.

The drive-mode application 1 may operate the native applications 331 by referring to the native applications 331.

In such a case, among the native applications 331, functions that are not desirable to be used during driving are restricted by the DD manager.

[Structure of Drive-Mode Application 1]

Subsequently, the structure of the drive-mode application 1 that is the program according to the present invention will be described with reference to FIG. 2.

Figure 2:
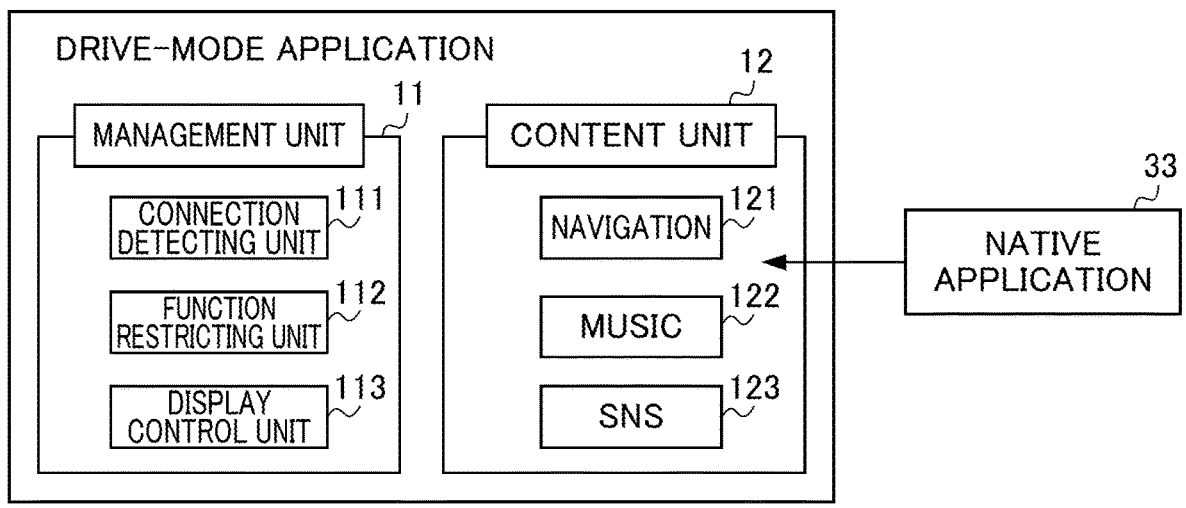
FIG. 2 is a diagram illustrating the structure of a drive-mode application according to the present embodiment.

As illustrated in FIG. 2, the drive-mode application 1 is configured to include: a management unit 11 that executes control in consideration of the prevention of driver distraction; and a content unit 12 that includes an application operating on the drive-mode application 1.

The content unit 12 stores a plurality of applications.

In this embodiment, the content unit 12 is assumed to store: a navigation application 121 that realizes a car navigation system; a music application 122 that realizes the playing of music; and an SNS application 123 that supports ties among users as a plurality of applications stored in the content unit 12.

A plurality of applications stored in the content unit 12 operates on the drive-mode application 1 one at a time or two or more at the same time.

The applications stored in the content unit 12 are not limited to the music application 122 and the SNS application 123.

The content unit 12 can store any given applications.

For example, although not illustrated in the drawing, the content unit 12 can store: navigation auxiliary applications (sub-application 3) such as a destination search application and a neighboring guide application; and information applications (sub-application 4) such as a traffic information application, a disaster information application, a vehicle information application; and a selling store information application.

The information terminal 50 executes the management unit 11, thereby causing the CPU 21 to function as a connection detecting unit 111; a function restricting unit 112; a display switching unit 113; and a display control unit 114.

In addition, the information terminal 50 executes the management unit 11, thereby causing the CPU 21 to execute a control method of an application including a connection detecting step, a function restricting step, a display switching step, and a display control step.

Hereinafter, the connection detecting unit 111, the function restricting unit 112, the display switching unit 113, and the display control unit 114 included in the information terminal 50 by executing the management unit 11 will be described.

The connection detecting step, the function restricting step, the display switching step, and the display control step included in the control method of an application that is executed by the information terminal 50 by executing the management unit 11 can be described by substituting "unit" with "step" in the following description, and thus, a description thereof will not be presented.

The connection detecting unit 111 detects a connection between the information terminal 50 and the vehicle.

In other words, the connection detecting unit 111 detects a wired connection or a wireless connection between the information terminal 50 and the vehicle via the communication unit 25.

When the connection detecting unit 111 detects a connection between the information terminal 50 and the vehicle receives a user's operation in addition to the detection made by the connection detecting unit 111, or when the connection detecting unit 111 detects that the vehicle is in the course of driving in addition to the detection made by the connection detecting unit 111, then, the function restricting unit 112 controls the operation of applications based on second control that is different from first control which is a control state of the information terminal 50 at a normal time at which the information terminal 50 is not connected to the vehicle.

In the second control, in order to satisfy the requirements to prevent driver distraction, some of user's operations that can be accepted in the first control are restricted, and some of applications that can be operated in the first control are restricted.

For example, an operation such as a text input that is complicated and requires a steady gaze at the display 24 corresponds to a user's operation restricted in the second control, and a video playing application involving staring at the display 24 corresponds to an application restricted in the second control.

In the present embodiment, some of the user's operations is restricted so as to satisfy the requirements to prevent driver distraction when connection to a vehicle is detected by the connection detecting unit 111. Alternatively, only applications designed in view of driver distraction may be activated in advance, and the configuration of the connection detecting unit 111 or the like may be omitted.

The display switching unit 113 switches the kind of application to be displayed on the display 24 based on a swiping operation received via the touch panel 241.

In a smartphone or the like, normally, since the kind of application is switched based on icons arranged on the home screen, it can be regarded that the display switching unit 113 switches the kind of application to be displayed on the display 24 in a form different from that of a normal time at which the information terminal 50 is not connected to the vehicle.

The display switching made by the display switching unit 113 will be described later in detail with reference to FIG. 4 and the like.

When it is detected that a functional icon (a first functional icon) for operating a predetermined function has been touched for a period longer than a predetermined period via the touch panel 241 in a state in which an application having the functional icon is displayed on the display 24, the display control unit 114 performs control such that one or more other functional icons (second functional icons) having different functions associated with the functional icon are displayed at different positions adjacent to a display position of the functional icon (the first functional icon).

The display control unit 114 operates a predetermined operation (a "first operation") set in advance to the functional icon when the functional icon (the first functional icon) is touched within a predetermined period.

More specifically, the first functional icon is associated with the first operation and one or more second functional icons different from the first functional icon. The display control unit 114 performs different control based on a touch operation on the first functional icon depending on whether the duration of the touch operation on the first functional icon is equal to or smaller than a predetermined period or more than the predetermined period.

Moreover, the display control unit 114 may display the first functional icon at a position different from the position when the touch operation was input as a new first functional icon.

Moreover, when the first functional icon is displayed at a position different from the position when the touch operation was input, the display control unit 114 may display the new first functional icon without changing the design thereof.

Moreover, when the first functional icon is displayed at a position different from the position when the touch operation was input, the display control unit 114 may continuously display the first functional icon at the position when the touch operation was input in a state where the first functional icon can be visually recognized as the old first functional icon and may allocate a function to the old first functional icon so that a second operation different from the first operation is operated by a touch operation.

The details of the operation switching control executed by the display control unit 114 when the functional icon is pressed will be described with reference to FIGS. 7 to 9.

[Display Example of Display 24]

Subsequently, display examples of the display 24 will be described with reference to FIGS. 3A to 3C.

Figure 3A:
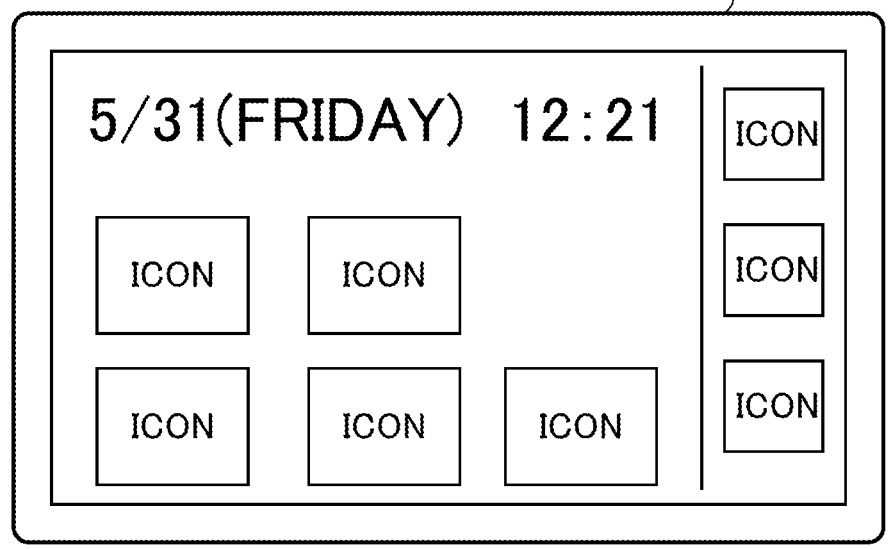
FIG. 3A is a display example of the display of an information terminal.

In FIG. 3A and subsequent drawings, while a landscape-oriented display will be described as an example of the display, the present invention may be realized by a portrait-oriented display.

FIG. 3A illustrates a display example at a normal time at which the information terminal 50 and the vehicle are not connected to each other.

At the normal time, a plurality of icons are displayed on the home screen of the display 24. When such an icon is selected via the touch panel 241, an application corresponding thereto operates and is displayed on the display 24.

Figure 3B:
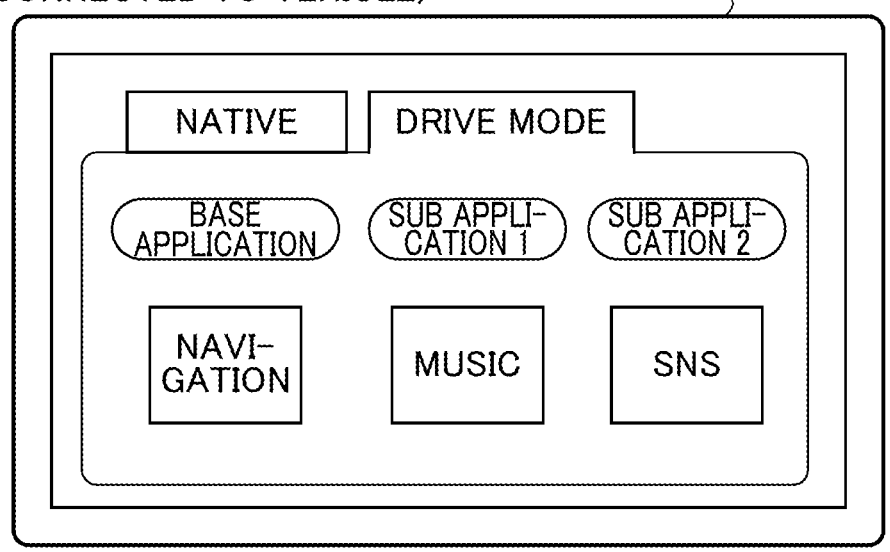
FIG. 3B is a display example of the display of an information terminal.

FIG. 3B illustrates an application setting screen of the drive-mode application 1.

In the drive-mode application 1, an application operating on the drive-mode application 1 is set in advance.

Such a setting is executed by selecting any given application from among the applications stored in the content unit 12.

It is to be understood that any given application may be selected not only from among applications stored in the content unit 12 but also from among the native applications.

At this time, a plurality of applications can be set as the application operating on the drive-mode application 1.

The plurality of applications include a plurality of sub-applications that are auxiliary in addition to one base application that is basic.

In this embodiment, it is assumed that the navigation application 121 is set as the base application, a plurality of music applications 122 is set as a sub-application 1, and a plurality of SNS applications 123 is set as a sub-application 2.

In addition, although not illustrated in the drawing, for example, navigation auxiliary applications (sub-application 3), such as a destination search application and a neighboring guide application and information applications (sub-application 4) such as a traffic information application, a disaster information application, a vehicle information application, and a selling store information application, can be set.

When the drive-mode application 1 operates, the basic display for the drive-mode application 1 is displayed on the display 24.

Figure 3C:
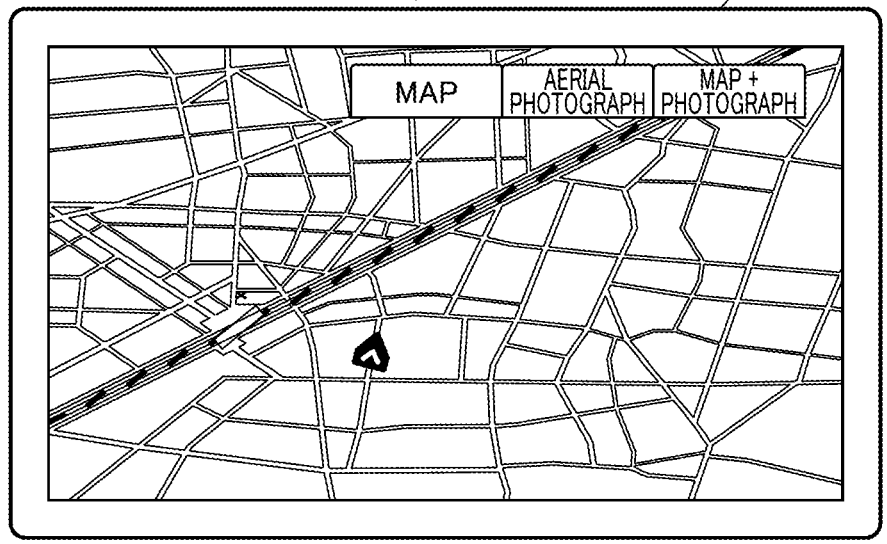
FIG. 3C is a display example of the display of an information terminal.

The basic display is executed based on the application set as the base application, and, in FIG. 3C, the display screen of the car navigation system that is based on the navigation application 121 is displayed on the display 24.

In the car navigation system, an icon representing the position of the user's own vehicle is displayed at the center, and, in accordance with the movement of the user's own vehicle, the map is scrolled and displayed.

[Display Switching Executed by Display Switching Unit 113]

On the display screen illustrated in FIG. 3C, when an occupant of the vehicle executes a swiping operation via the touch panel 241, the display switching unit 113 switches the kinds of application to be displayed on the display 24.

Figure 4:
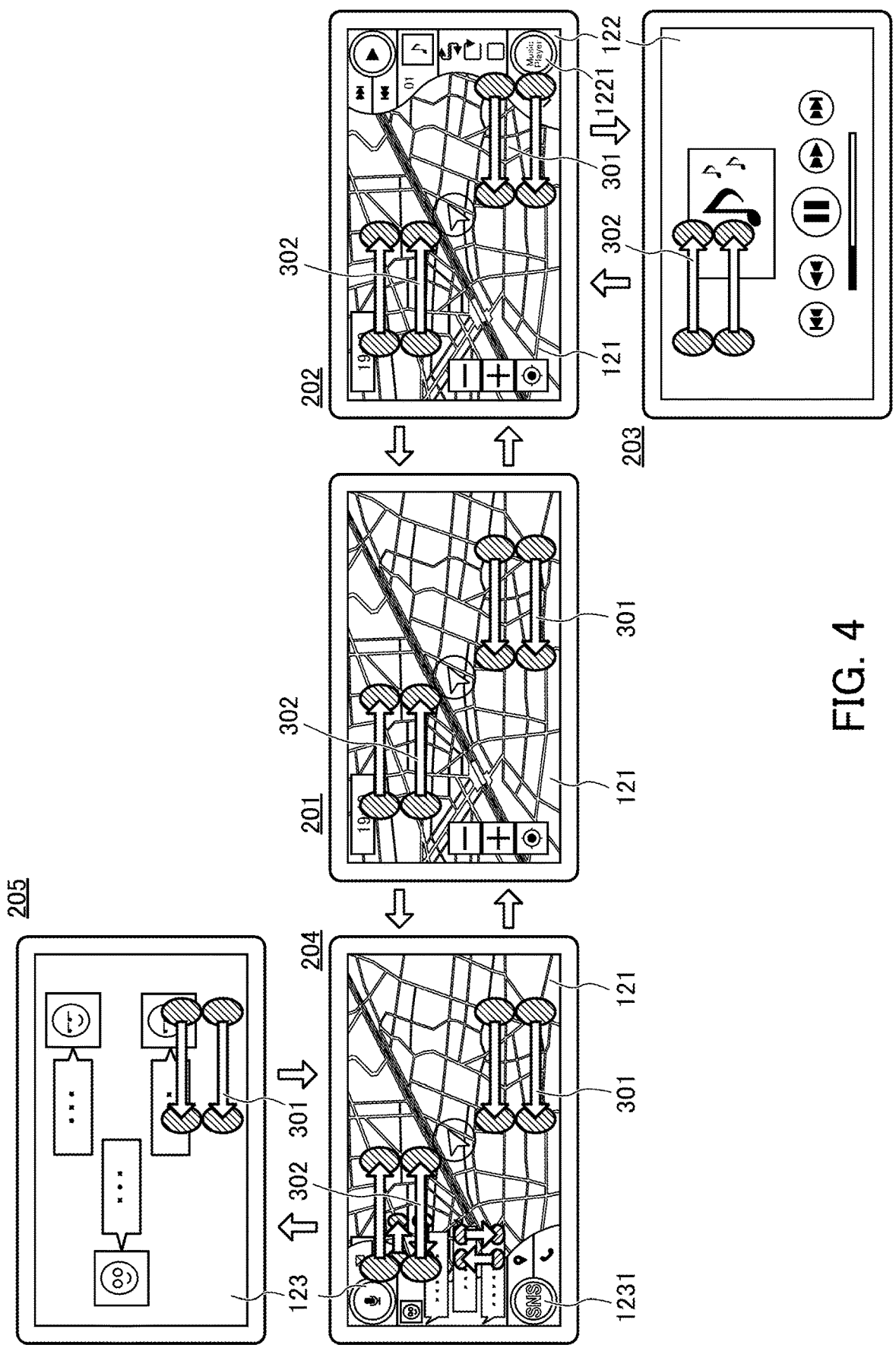
FIG. 4 is a diagram illustrating display switching executed by a display switching unit.

The display switching executed by the display switching unit 113 is illustrated in FIG. 4.

In FIG. 4, a swiping operation 301 (from the right side to the left side) is an operation of moving a finger to the left side after bringing the finger into contact with the touch panel 241, and a swiping operation 302 (from the left side to the right side) is an operation of moving a finger to the right side after bringing the finger into contact with the touch panel 241.

As illustrated in FIG. 4, on the display screen 201, as the basic display for the drive-mode application 1, the navigation application 121 (base application) is displayed on the entire screen of the display 24.

On this display screen 201, when an occupant of the vehicle executes the swiping operation 301 (from the right side to the left side) via the touch panel 241, the display switching unit 113 switches the display of the display 24 from the display screen 201 to the display screen 202.

On this display screen 202, the music application 122 (sub-application 1) is displayed on the right side of the display 24, and the navigation application 121 (base application) is displayed in the other area (remaining area) as it is.

In other words, for the user, visually, the music application 122 (sub-application 1) is depicted as being superimposed on the navigation application 121 (base application).

Generally, such a sub-application is also called a "widget".

Here, since the swiping operation 301 (from the right side to the left side) is an operation of moving a finger to the left side, the display switching from the display screen 201 to the display screen 202 is performed as follows: the display is switched as if the music application 122 enters into the display 24 from the right outer side of the display 24 in accordance with the movement of the finger (hereinafter, also referred to as "swiping in").

When a full screen display button 1221 arranged on the music application 122 is tapped (pressed), the display switching unit 113 switches the display of the display 24 from the display screen 202 to the display screen 203.

On this display screen 203, the music application 122 (sub-application 1) is displayed on the entire screen of the display 24.

While details will be described next with reference to FIG. 6, on the display screen 202, when an occupant of the vehicle again executes the swiping operation 301 (from the right side to the left side) via the touch panel 241, the display switching unit 113 further swipes in another music application 122 of a plurality of music applications 122 different from that of the music application 122 currently displayed on the display screen 202.

On the other hand, on the display screen 202, when the occupant of the vehicle executes the swiping operation 302 (from the left side to the right side) via the touch panel 241, the display switching unit 113 returns the display of the display 24 from the display screen 202 to the display screen 201 and displays the navigation application 121, which has been displayed in the remaining area of the display 24, on the entire screen of the display 24.

The display switching executed by the display switching unit 113 in a case when the swiping operation 302 (from the left side to the right side) is executed is basically the same as that executed in a case when the swiping operation 301 (from the right side to the left side) is executed.

In other words, on the display screen 201, when the swiping operation 302 (from the left side to the right side) is executed, the display switching unit 113 switches the display of the display 24 from the display screen 201 to the display screen 204 (swiping in).

At this time, on the display screen 204, the SNS application 123 (sub-application 2) is displayed on the left side of the display 24, and the navigation application 121 (base application) is displayed in the other area (remaining area) as it is.

When a full screen display button 1231 arranged on the SNS application 123 is tapped (pressed), the display switching unit 113 switches the display of the display 24 from the display screen 204 to the display screen 205 and displays the SNS application 123, which has been displayed on the left side, on the entire screen of the display 24.

In addition, on the display screen 204, when the swiping operation 301 (from the right side to the left side) is executed, the display switching unit 113 returns the display of the display 24 from the display screen 204 to the display screen 201 and displays the navigation application 121, which has been displayed in the remaining area of the display 24, on the entire screen of the display 24.

While details will be described next, when the swiping operation 302 (from the left side to the right side) is again executed on the display screen 204, the display switching unit 113 can further swipe in another SNS application 123 of a kind different from that of the SNS application 123 displayed on the display screen 204.

As described above, in the drive-mode application 1, it is possible to switch an application to be displayed on the display 24 when an occupant of a vehicle performs a swiping operation via the touch panel 241. Moreover, the occupant of the vehicle only needs to perform a swiping operation in the opposite direction via the touch panel 241 when the occupant wants to restore the switched application.

In this way, unlike an icon operation, it is not necessary to visually recognize the display 24, it is possible to immediately switch applications and to suppress the driver from moving the eyes off the road during driving.

In case of FIG. 4, while the number of the sub-applications to be switched to from the base application is two which are a t the left and right sides, the number of sub-applications may be further increased.

The display can be switched in any manner when the number of sub-applications is increased. An example thereof is illustrated in FIGS. 5 and 6.

In FIG. 4, an application to be displayed on the display 24 is switched based on a horizontal swiping operation. However, in FIG. 5, an application to be displayed on the display 24 is switched based on a vertical swiping operation in addition to a horizontal swiping operation.

Figure 5:
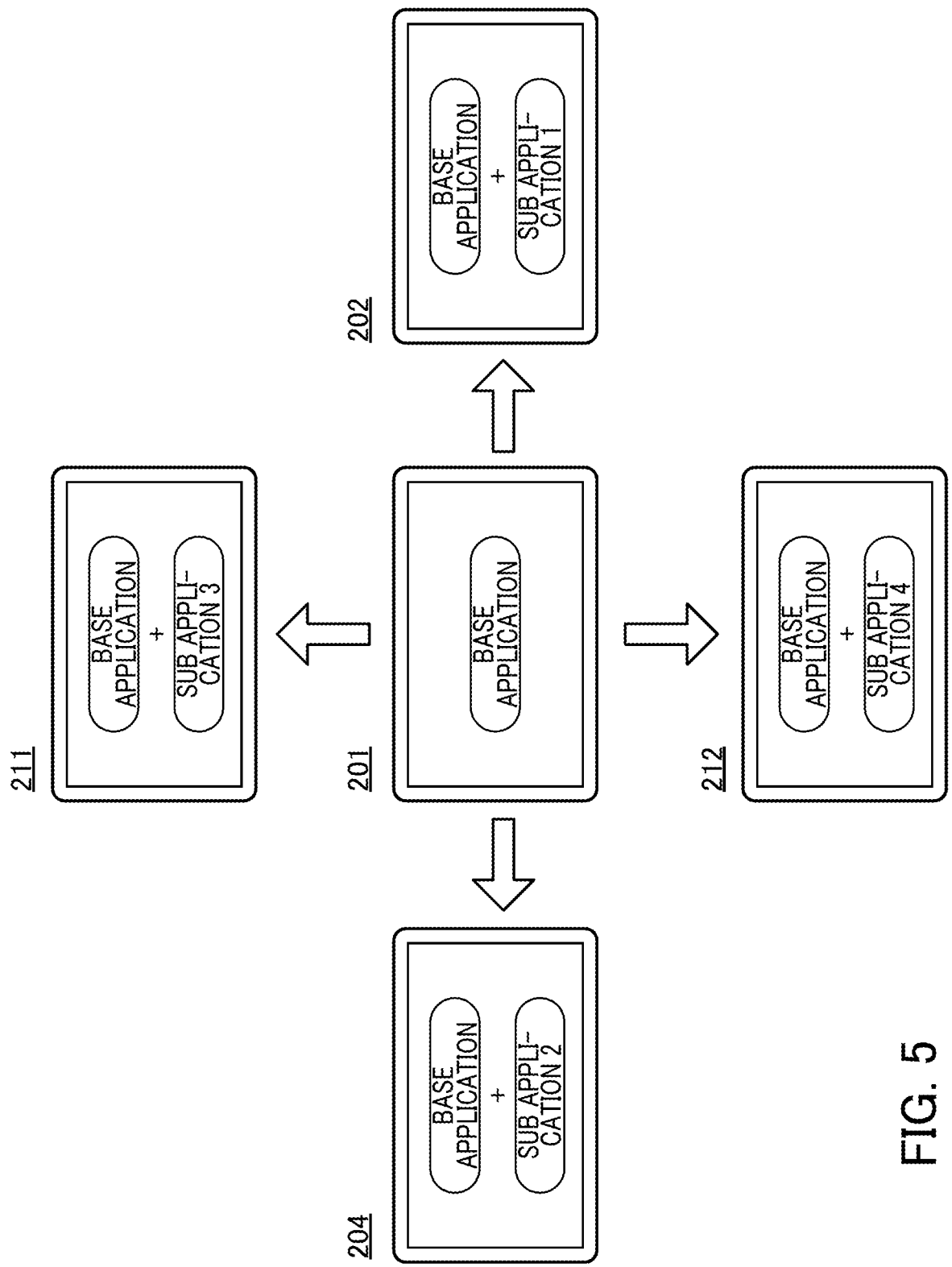
FIG. 5 is a diagram illustrating display switching executed by a display switching unit.

Referring to FIG. 5, on a display screen 201, the base application is displayed on the entire screen of the display 24.

On this display screen 201, when a horizontal swiping operation is performed, the display of the display 24 is switched to display screens 202 and 204.

This point is as illustrated in FIG. 4.

On the other hand, on this display screen 201, when a vertical swiping operation, for example, a swiping operation of moving a finger brought into contact with the touch panel 241 to the lower side is executed, the display of the display 24 is switched from the display screen 201 to a display screen 211.

In other words, the sub-application 3 (for example, a navigation auxiliary application) is displayed on the upper side of the display 24, and the navigation application that is the base application is displayed in the remaining area of the screen.

Similarly, on this display screen 201, when a swiping operation of moving a finger brought into contact with the touch panel 241 to the upper side is executed, the display of the display 24 is switched from the display screen 201 to the display screen 212, and the sub-application 4 (for example, an information application) is displayed on the lower side of the display 24, and the navigation application that is the base application is displayed in the remaining area of the screen.

In this way, by switching the application to be displayed on the display 24 based on a vertical swiping operation in addition to a horizontal swiping operation, switching among a maximum of four sub-applications can be executed from the display screen 201.

While details will be described next, in a case when a plurality of mutually-different navigation auxiliary applications (sub-application 3) are set, when a swiping operation of further moving the finger brought into contact with the touch panel 241 to the lower side is executed on the display screen 211, the display switching unit 113 can further swipe in a navigation auxiliary application (sub-application 3) of a different kind.

Similarly, in a case when a plurality of mutually-different information applications (sub-application 4) are set, when a swiping operation further moving the finger brought into contact with the touch panel 241 to the upper side is executed on the display screen 212, the display switching unit 113 can further swipe in an information application (sub-application 4) of a different kind.

Another method for swiping in a plurality of sub-applications will be described in detail with reference to FIG. 6.

Here, as illustrated in FIG. 3B, it is assumed that a plurality of music applications 122 (sub-application 1) are set in advance by a user by using an application setting screen.

Figure 6:
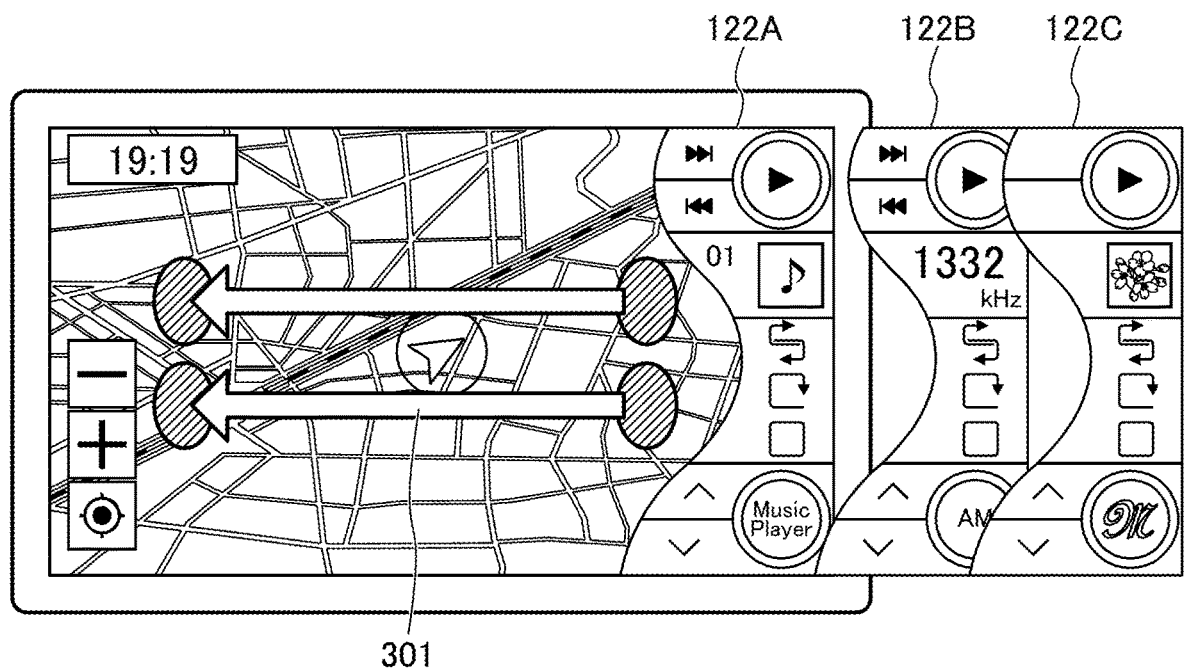
FIG. 6 is a diagram illustrating display switching executed by a display switching unit.

FIG. 6 illustrates a concept of swiping in, for example, the remaining music applications 122B and 122C as an occupant of the vehicle further executes the swiping operation 301 (from the right side to the left side) via the touch panel 241 in a state in which the music application 122A (sub-application 1) is displayed on the right side (corresponding to the display screen 202 illustrated in FIG. 4).

In the state (the display screen 202 illustrated in FIG. 4) in which a music application 122A (sub-application 1) is displayed on the right side, when the occupant of the vehicle further executes the swiping operation 301 (from the right side to the left side) via the touch panel 241, the display switching unit 113 swipes in another sub-application 1, e.g., a music application 122B of the plurality of music applications 122, which is different from that of the music application 122A displayed on the display screen 202.

By doing so, on the display screen, the music application 122B (sub-application 1) is displayed on the right side of the display 24, and the navigation application 121 (base application) is displayed in the other area (remaining area) as it is.

With the above configuration, a plurality of kinds sub-applications can be switched.

In a case when a plurality of sub-applications are assigned to the swiping operation, when the switching is executed, it is preferable to generate an identification sound from a speaker (not illustrated in the drawing).

For example, it may be configured so that a first sub-application generates a sound "PI", a second sub-application generates a sound "PIPI", and a third sub-application generates a sound of "PIPIPI".

For example, in a case where any one of three kinds of music application 122 are swiped in when the occupant of the vehicle executes the swiping operation 301 (from the right side to the left side) via the touch panel 241 while the navigation application 121 (base application) is displayed on the display screen 201, the display switching unit 113 may be configured to swipe in the music application 122 (sub-application 1) that has been most recently used by the user in advance.

In addition, in a case when the occupant of the vehicle further executes the swiping operation 301 (from the right side to the left side) via the touch panel 241, the music applications 122 (sub-applications) to be swiped in by the display switching unit 113 when the user performs the second and subsequent swipes may be determined based on the frequencies of the use of the music applications 122 (sub-applications) used by the user in the past.

For example, in a case where any one of three kinds of music application 122 are swipe in when the occupant of the vehicle executes the swiping operation 301 (from the right side to the left side) via the touch panel 241 while the navigation application 121 (base application) is displayed on the display screen 201, the display switching unit 113 may determine the order of the music application 122 to be swiped in as follows. Instead of first swiping in the music application 122 (sub-application 1) that has been most recently used by the user, the display switching unit 113 may be configured to determine the music applications to be swiped in based on the frequencies of use of the music applications 122 (sub-applications 1) used by the user in the past.

As described above, for example, in a case where three kinds of music application 122 (sub-applications 1) are swiped in when the occupant of the vehicle executes the swiping operation 301 (from the right side to the left side) via the touch panel 241 while the navigation application 121 (base application) is displayed on the display screen 201, the user may set in advance a selection criterion regarding which music application 122 (sub-application 1) of the plurality of music applications 122 (sub-applications 1) will be selected and swiped in when the user performs the first swipe and which music applications 122 (sub-applications 1) of the plurality of music applications 122 (sub-applications 1) will be selected to be swiped in when the user performs the second and subsequent swipes.

Also in a case when a plurality of SNS applications 123 (sub-applications 2) are set in advance by the user using the application setting screen, similar to the case described above, the another method for swiping in a plurality of sub-applications may be used.

In other words, for example, in a case where three kinds of SNS application 123 (sub-application 2) are swiped in when the occupant of the vehicle executes the swiping operation 301 (from the left side to the right side) via the touch panel 241 while the navigation application 121 (base application) is displayed on the display screen 201, the method described above may be used.

In such a case, another method for swiping the plurality of SNS applications 123 (sub-applications 3) from the left side to the right side can be explained using the above explanation by replacing "music application 122 (sub-application 1)" with "SNS application 123 (sub-application 2)", replacing "swiping operation 301 (from the right side to the left side" with "swiping operation 302 (from the left side to the right side", replacing "state (the display screen 202 illustrated in FIG. 4) in which the music application 122A (sub-application 1) is displayed on the right side" with "state (the display screen 204 illustrated in FIG. 4) in which the SNS application 123A (sub-application 2) is displayed on the left side", and replacing "music applications 122B and 122C" with "SNS applications 123B and 123C". are replaced with.

As illustrated in FIG. 5, when a plurality of sub-applications 3 to be drawn on the upper side of the display 24 are set, and the user performs a swiping operation of moving a finger brought into contact with the touch panel 241 in the vertical direction of the display screen 201, for example, from the upper side to the lower side, the another method for swiping the plurality of sub-applications 3 into the screen similar to the description presented above may be used.

In such a case, another method for swiping in the plurality of sub-applications 3 from the upper side to the lower side can be explained using the above explanation by replacing "music application 122 (sub-application 1)" with "sub-application 3A", replacing "swiping operation 301 (from the right side to the left side" with "swiping operation (from the upper side to the lower side)", replacing "state (the display screen 202 illustrated in FIG. 4) in which the music application 122A (sub-application 1) is displayed on the right side" with "state in which the sub-application 3 is displayed on the upper side", and replacing "music applications 122B and 122C" with "sub-applications 3B and 3C", Similarly, as illustrated in FIG. 5, when a plurality of sub-applications 4 to be drawn on the lower side of the display 24 are set, and the user performs a swiping operation of moving a finger brought into contact with the touch panel 241 in the vertical direction of the display screen 201, for example, from the lower side to the upper side is executed, the another method for swiping the plurality of sub-applications into the screen similar to the description presented above may be used.

In such a case, another method for swiping the plurality of sub-applications 4 from the lower side to the upper side can be explained using the above explanation by replacing "music application 122 (sub-application 1)" with "sub-application 4A", replacing "swiping operation 301 (from the right side to the left side" with "swiping operation (from the lower side to the upper side)", replacing "state (the display screen 202 illustrated in FIG. 4) in which the music application 122A (sub-application 1) is displayed on the right side" with "state in which the sub-application 4 is displayed on the lower side", and replacing "music applications 122B and 122C" with "sub-applications 4B and 4C",

[Operation Switching Control by Display Control Unit 114 when Functional Icon is Pressed]

Next, the functional icons will be described with reference to FIG. 7.

A music and video playing application 122D (the sub-application 1) drawn by a swiping operation is displayed on the right side of the navigation application 121 (a base application).

A sub-application is generally referred to as a "widget".

The widget has a shape of which a part forms a part of a circle on the side that is not in contact with the side face of the screen.

This "side" forms a circle having a constant radius from a position located near the center of the screen.

The position located near the center of the screen represents the position of the user's own vehicle.

The reason for this is that it is preferable for the user to constantly acquire neighboring information (roads, traffic congestion, and facilities) in a certain range from the position of the user's own vehicle, and, in order to prevent the information from being hidden by the widget, such a shape of the widget is employed.

A widget has buttons (functional icons) for operating the functions of the widget. In the music and video playing application 122D illustrated in FIG. 7, a play/stop button 122D1 is displayed as a functional icon (a first functional icon).

When the functional icon of the play/stop button 122D1 is touched once, content is played. When the functional icon is touched once more, the playing of the content is stopped.

The size of a widget needs to be decreased in order to avoid an adverse effect on a navigation screen (a map screen) of the navigation application 121 which is a base application.

Particularly, playing of music and video requires many functions (for example, fast forward, rewind, previous content, next content, and volume up and down) in addition to play and stop.

In this way, in the present embodiment, the play/stop button 122D1 is used as the first functional icon and is associated with a first operation relating to play and stop of content and one or more second functional icons different from the first functional icon. In this way, the display control unit 114 performs different control based on a touch operation on the first functional icon depending on whether the duration of the touch operation on the functional icon (the first functional icon) of the play/stop button 122D1 is equal to or smaller than a predetermined threshold or more than the threshold.

That is, the display control unit 114 is configured to display other functional icons (second functional icons) indicating the functions associated with the functional icon (the first functional icon) of the play/stop button 122D1 at different positions when the functional icon of the play/stop button 122D1 is long-pressed.

The threshold may be adjusted appropriately, and it may be determined that the functional icon is "long-pressed" when the duration exceeds one seconds, for example.

Figure 8:
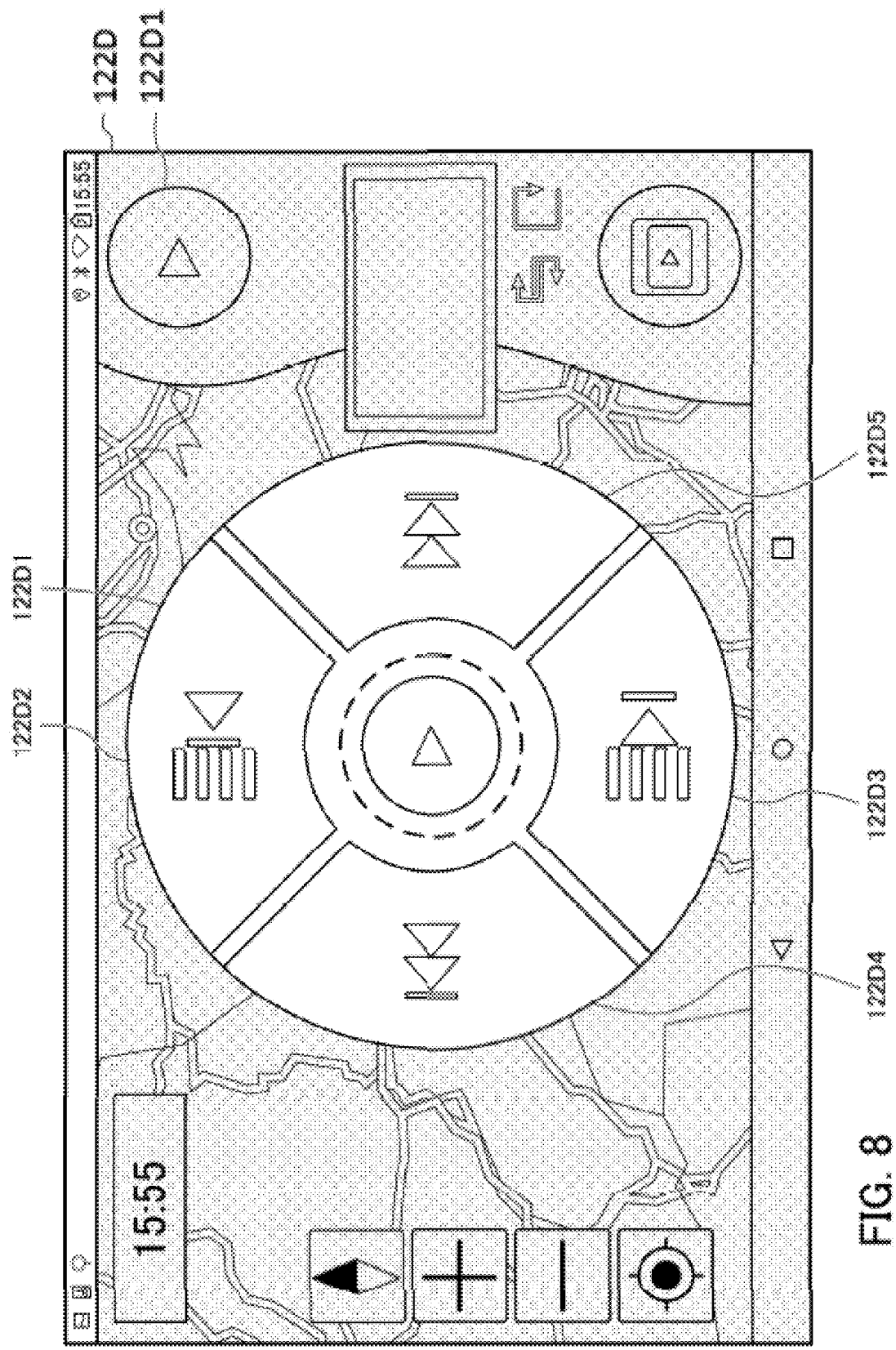
FIG. 8 is a diagram illustrating how new first and second functional icons are displayed when a first functional icon (a "play/stop button") is long-pressed.

FIG. 8 illustrates a display example of another functional icon displayed when the functional icon (the first functional icon) of the play/stop button 122D1 is long-pressed.

Figure 7:
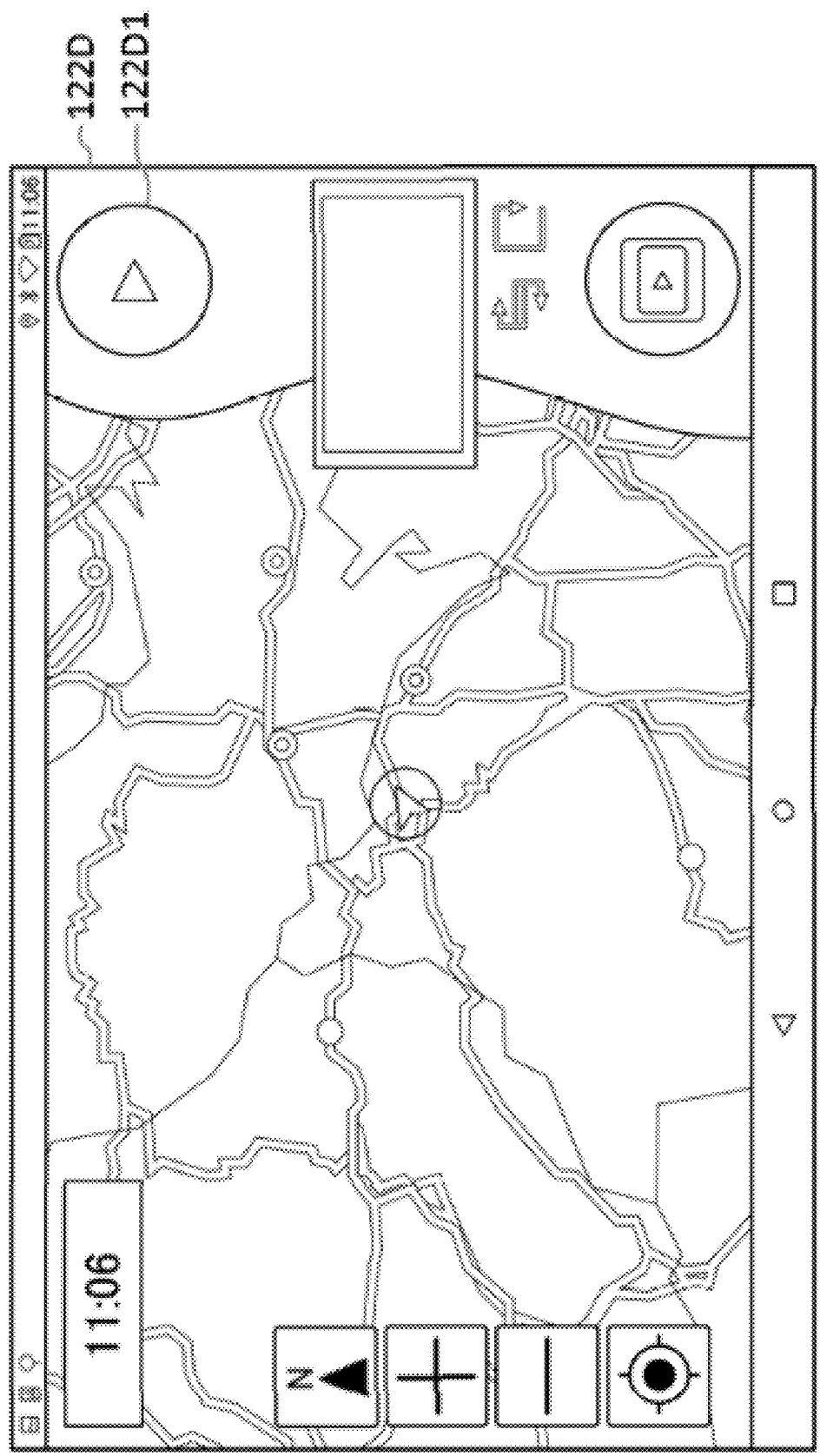
FIG. 7 is a diagram illustrating a widget of a sub-application (a music and video playing application) drawn on the right side of a navigation application.

In FIG. 8, the position of the long-pressed functional icon (the first functional icon) of the play/stop button 122D1 is moved from the initial position illustrated in the widget of FIG. 7 to the center of the screen which is another position, and a functional icon (the second functional icon) which is another functional button is arranged at an adjacent position so as to surround the functional icon of the play/stop button 122D1.

In the present embodiment, for the sake of convenience, the moved first functional icon will be referred to as a "new first functional icon," and the first functional icon continuously displayed at the position before movement will be referred to as an "old first functional icon".

The design and the size of the new first functional icon are the same as those of the functional icon.

By doing so, even when the display position is changed, the user can immediately recognize that the functional icons have the same functions.

In FIG. 8, four functional icons in total are displayed as the second functional icons. Specifically, a previous playlist button 122D2 is displayed in an upper region adjacent to the functional icon (the first functional icon) of the play/stop button 122D1 which is the first function, a next playlist button 122D3 is displayed in a lower region, a previous content (music) button 122D4 is displayed in a left region, and a next content (music) button 122D5 is displayed in a right region.

Although the number of functional icons may be one or more, the number is preferably 8 or smaller when usability is taken into consideration.

In this way, the functions of the functional icon moved to the center of the screen and the adjacent functional icons can be executed by a touch operation.

In the present embodiment illustrated in FIG. 8, although the old first functional icon is also displayed continuously, the lightness thereof is decreased.

By doing so, the display of the new first functional icon and the second functional icons can be displayed in a more noticeable manner.

A function different from the first functional icon may be allocated to the old first functional icon.

In this case, the lightness of the old first functional icon is decreased whereby users can be informed of the fact that a function different from the first functional icon is allocated thereto.

As an example, a function (a cancel button) of cancelling the display of the new first functional icon and the second functional icons may be allocated to the old first functional icon instead of the function of the "play/stop button" which is the function of the first functional icon.

The cancel function (the cancel button) is an example, and the function is not limited thereto.

The cancel button is not limited to the region of the old first functional icon, and the cancel button may be allocated to the entire region in which the lightness is decreased, so that the usability is improved further.

In the embodiment illustrated in FIG. 8, the lightness of the region outside of the new first functional icon and the second functional icons is decreased. When a cancel button is allocated to this entire region in which the lightness is decreased, usability is further improved.

As illustrated in FIG. 8, the new first functional icon and the second functional icons are arranged in a circular form.

With regard to arrangement, it is preferable to arrange the icons so that the central position of the first functional icon matches the center of the screen.

By doing so, the new first functional icon and the second functional icons are arranged always at the same position. Therefore, the user does not need to store the positions of the functional icons and can immediately operate the functional icons.

The diameter of a combination of the new first functional icon and the second functional icons preferably has a certain size or more in relation to the length of the side of the screen.

In the present embodiment, the diameter is 90% or more of the length of the vertical side of the screen.

In a case where the horizontal direction of the screen is adopted as a reference, the diameter has a length of ⅓ or more of the length of the horizontal length of the screen.

A total area of the new first functional icon and the second functional icons may be defined in relation to the area of the screen. In this case, the total area of the new first functional icon and the second functional icons may be 30% or more, for example, of the area of the screen.

When the functional icons have such a size, the user's operability is improved remarkably.

Figure 9:
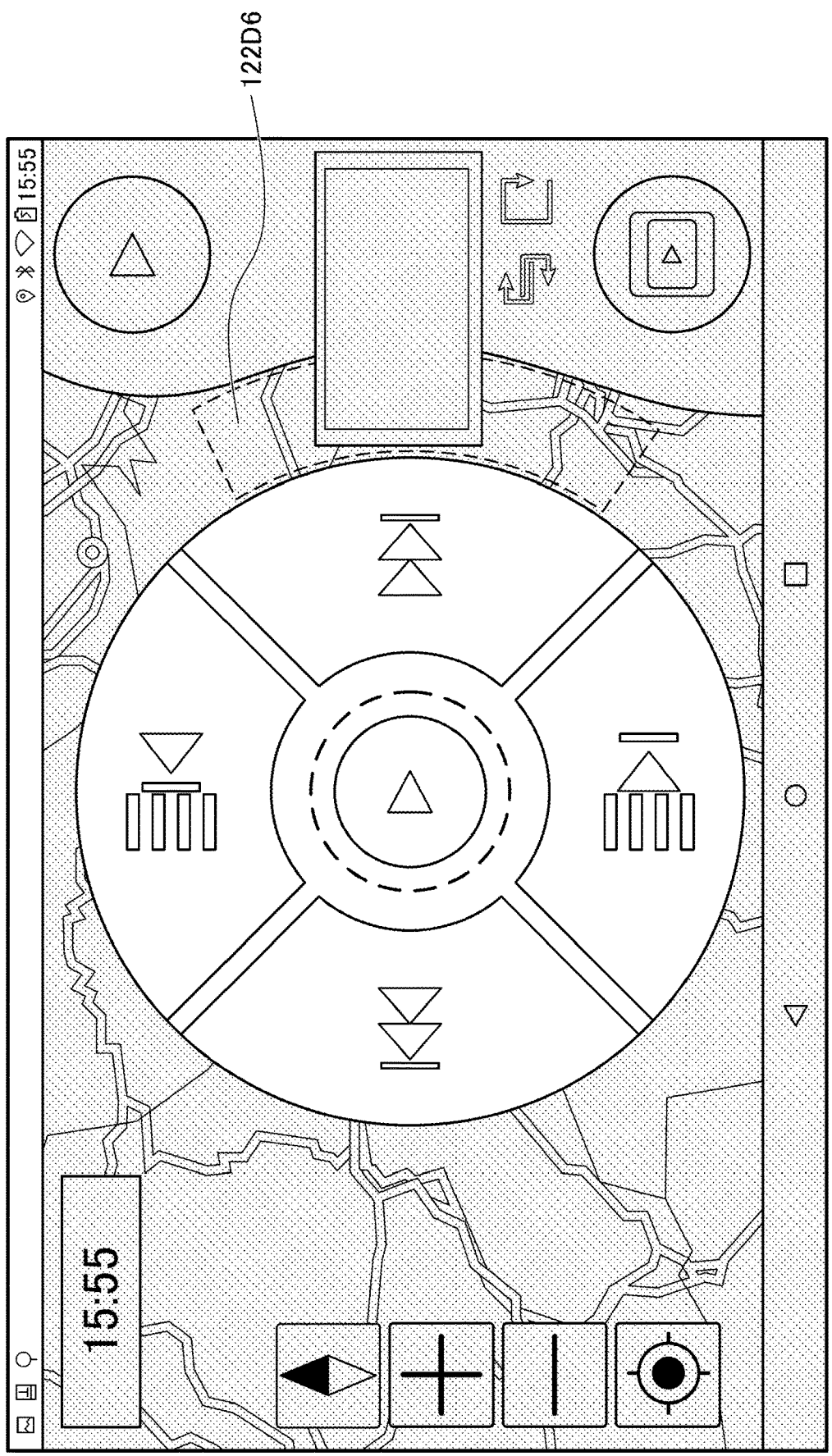
FIG. 9 is a diagram illustrating a relation between a contour of a widget and a circumference of the second functional icon.

Referring to FIG. 9, the curvature of a portion of the circumference of the second functional icon is designed to be substantially identical to the curvature of a portion of the side of the widget.

Although the visibility of the design of a functional icon is generally improved when the contour is thick, the area to be used for characters and the design decreases if the contour is thickened.

In this way, as in the present embodiment, when the curvature of a portion of the circumference of the second functional icon is designed to be substantially identical to the curvature of a portion of the side of the widget, a region 122D6 surrounded by a broken line like a contour appears between the circumference of the second functional icon and the side of the widget. Therefore, it is possible to secure visibility even when a thick contour is not provided.

According to the drive-mode application 1 according to the present embodiment described above, the following effects are obtained.

The display control unit 114 displays a second functional icon to which an operation different from a first operation allocated to a first functional icon is allocated so that the second functional icon is operated by a touch operation of a user at a position adjacent to the first functional icon when the first functional icon is long-pressed.

In this way, it is possible to easily call the second functional icon for executing another function by long-pressing the first functional icon and the operability of the vehicle driver is improved.

The display control unit 114 displays a plurality of second functional icons around the first functional icon when the first functional icon is long-pressed.

In this way, it is possible to easily display a plurality of second functional icons for executing other functions around the first functional icon by long-pressing the first functional icon, and the operability of the vehicle driver, for example, is improved.

The display control unit 114 displays the first functional icon as a new first functional icon at another position when the first functional icon is long-pressed.

In this way, the users can operate the first functional icon easily and immediately since the first functional icon can be displayed at an easily noticeable position of the display 24.

The display control unit 114 does not change the design of the new first functional icon when the first functional icon is displayed at a position different from the position when the touch operation was input.

In this way, the user can immediately recognize that the functional icons are the same functions.

The display control unit 114 performs control so that a second operation different from a first operation is executed by a touch operation on an old first functional icon when the user long-presses the first functional icon.

In this way, it is possible to use the second function by pressing the old first functional icon and the user's usability is improved.

The display control unit 114 can cancel the display of the old first functional icon by pressing the old first functional icon.

In this way, by allocating the function of cancelling the display of the old first functional icon to the old first functional icon, it is not necessary to provide an additional cancel button and the user's usability is improved.

The display control unit 114 displays the first functional icon and the second functional icon in a large area on the display screen.

By doing so, the user can immediately ascertain the position of the functional icons and the usability is improved.

The display control unit 114 performs display in such a manner that the curvature of a portion of the contour of a widget in which the first functional icon is displayed is substantially identical to the curvature of the circumference of the second functional icon.

In this way, since a contour-like region appears between the circumference of the second functional icon and the side of the widget, it is possible to secure visibility even when a thick contour is not provided.

As above, while preferred embodiments of the drive-mode applications 1 and 1A of the present invention have been described, the present invention is not limited to the embodiments described above but may be appropriately changed.

For example, in the embodiment described above illustrated in FIGS. 4 and 6, a horizontal swiping operation has been described as an example of the "swiping operation executed in the first direction" and the "swiping operation executed in the second direction which is the direction opposite to the first direction".

In this point, the "swiping operation executed in the first direction" and the "swiping operation executed in the second direction which is the direction opposite to the first direction" may be vertical swiping operations.

Instead of swiping operation for operating an application, the application may be operated by interpreting speech about various selections and instructions given by an occupant of a vehicle which is input through a microphone (not illustrated in the drawing) using a speech recognition technology.

In the embodiment described above, while a smartphone or a tablet terminal has been described as the information terminal 50, the information terminal 50 is not limited thereto. The present invention can be applied to various devices such as a PND (personal navigation device), a PDA (personal digital assistant), a gaming device, an in-vehicle navigation device, and a personal computer.

In addition, the present invention may be mainly executed by hardware using a constituent element such as an application-specific integrated circuit ("ASIC") or a field programmable gate array ("FPGA").

Furthermore, the present invention may be executed using a combination of both hardware and software.

A program used for realizing the function of the information terminal 50 may be recorded in a Non-transitory computer-readable recording medium, and the program recorded in the recording medium may be read and executed by a computer system so as to realize the function.

Here, the "computer system" is assumed to include an OS and hardware, such as peripheral devices.

In addition, the "Non-transitory computer-readable recording medium" represents a portable medium such as a flexible disk, a magneto-optical disk, a ROM, or a CD-ROM or a storage device, such as a hard disk built in the computer system.

As above, while the preferred embodiments have been described, the present invention can be executed in various forms without being limited to the embodiments described above.

The effects described in the embodiment described above are only enumerations of preferred effects obtained from the present invention, and the effects according to the present invention are not limited to those described above.

EXPLANATION OF REFERENCE NUMERALS

1, 1A . . . Drive-mode application, 11 . . . Management unit, 111 . . . Connection detecting unit, 112 . . . Function restricting unit, 113 . . . Display switching unit, 114 . . . Display control unit, 12 . . . Content unit, 121 . . . Navigation application, 122 . . . Music application, 123 . . . SNS application, 50 . . . Information terminal, 1221 . . . Entire screen display button of music application, 1231 . . . Entire screen display button of SNS application

What is claimed is:

1. An information terminal controlling an operation of an application according to a user's operation received via a touch panel mounted on a display device, the information terminal comprising:

a display control unit configured to display a first functional icon assigned with a first operation that is activated when the user performs a tap operation on the first functional icon for a predetermined period of time or less via the touch panel, wherein, in a state where the first functional icon is displayed on the display device such that the first operation is ready to be activated when the tap operation is performed on the first functional icon for the predetermined period of time or less, when the user performs the tap operation on the first functional icon for more than the predetermined period of time via the touch panel, the display control unit displays a second functional icon at a position adjacent to the first functional icon, wherein the second functional icon is assigned with an operation different from the first operation and associated with the first operation of the first functional icon, the operation assigned to the second functional icon being executed when the user performs a tap operation on the second functional icon, wherein when the display control unit displays the second functional icon, the display control unit displays a new first functional icon at a position different from a position where the user performs the tap operation on the first functional icon, continuously displays, as an old first functional icon, the first functional icon in a visually recognizable manner, and allocates a function to the old first functional icon so that when the user performs a tap operation on the old first functional icon a second operation is activated.

2. The information terminal according to claim 1, wherein the second functional icon includes a plurality of second functional icons, and the display control unit displays the plurality of second functional icons around the first functional icon.

3. The information terminal according to claim 1, wherein the display control unit does not change a design of the new first functional icon when displaying the new first functional icon at the position different from the position where the user performs the tap operation on the first functional icon.

4. The information terminal according to claim 1, wherein the display control unit allocates the second operation which is a function of cancelling the display of the new first functional icon to a region outside of the regions of the new and old first functional icons.

5. The information terminal according to claim 1, wherein the display control unit displays the new first functional icon and the second functional icon so that a total area thereof is a predetermined percentage or more with respect to the area of the display device.

6. The information terminal according to claim 1, wherein the display control unit displays the second functional icon so that a curvature of a portion of a contour of a widget in which the first functional icon is displayed is substantially identical to a curvature of a circumference of the second functional icon.

* * * * *